Dec. 11, 1928.
J. M. McCLATCHIE
1,694,828
APPARATUS FOR TESTING CANS FOR LEAKAGE
Original Filed June 15, 1926    4 Sheets-Sheet 3
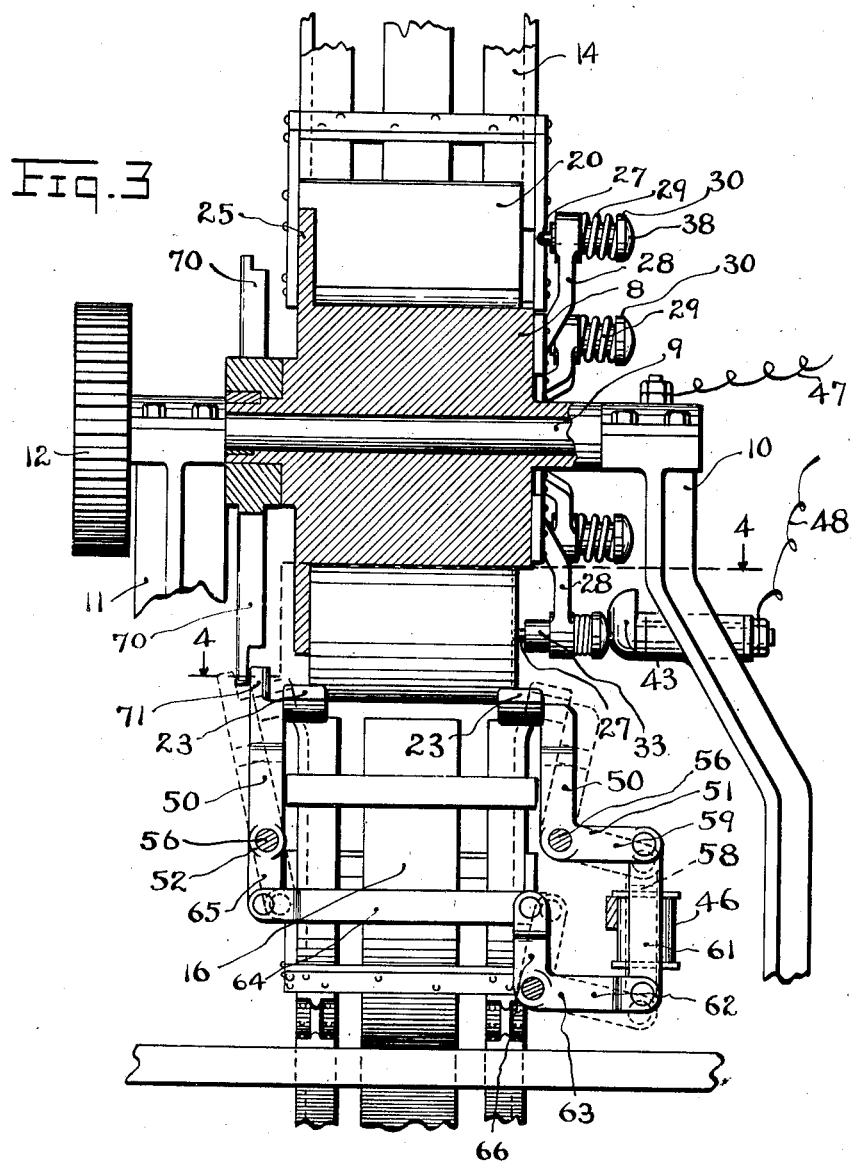

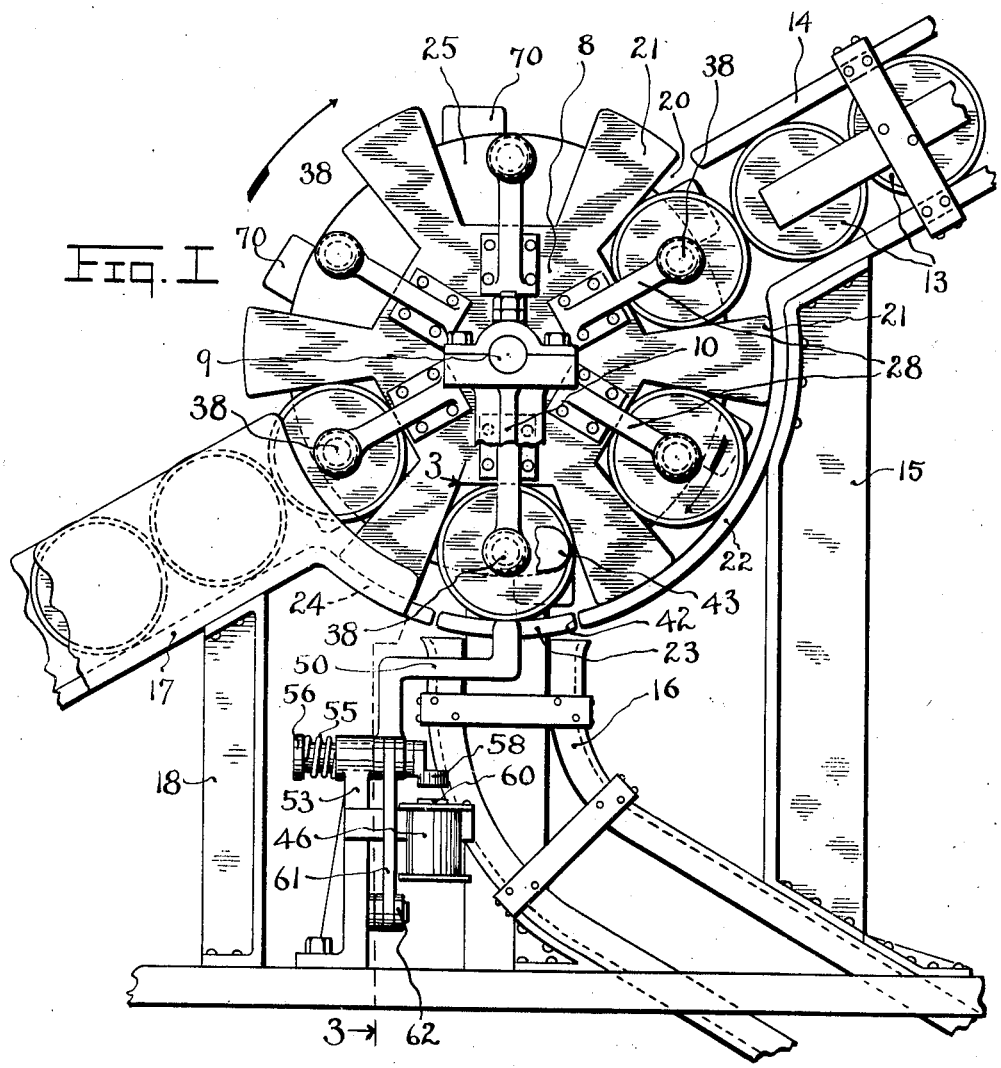

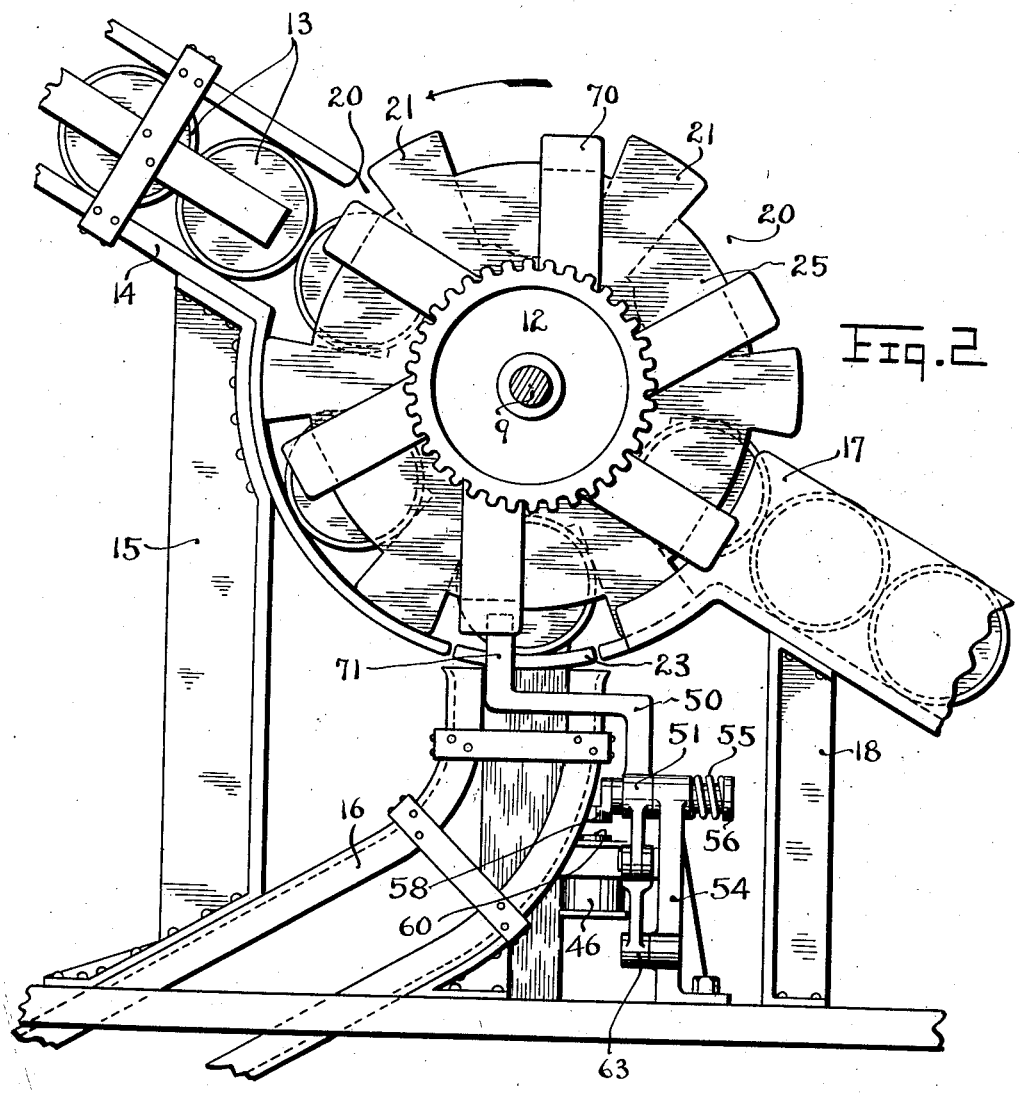

Dec. 11, 1928.
J. M. McCLATCHIE
1,694,828
APPARATUS FOR TESTING CANS FOR LEAKAGE
Original Filed June 15, 1926    4 Sheets-Sheet 4
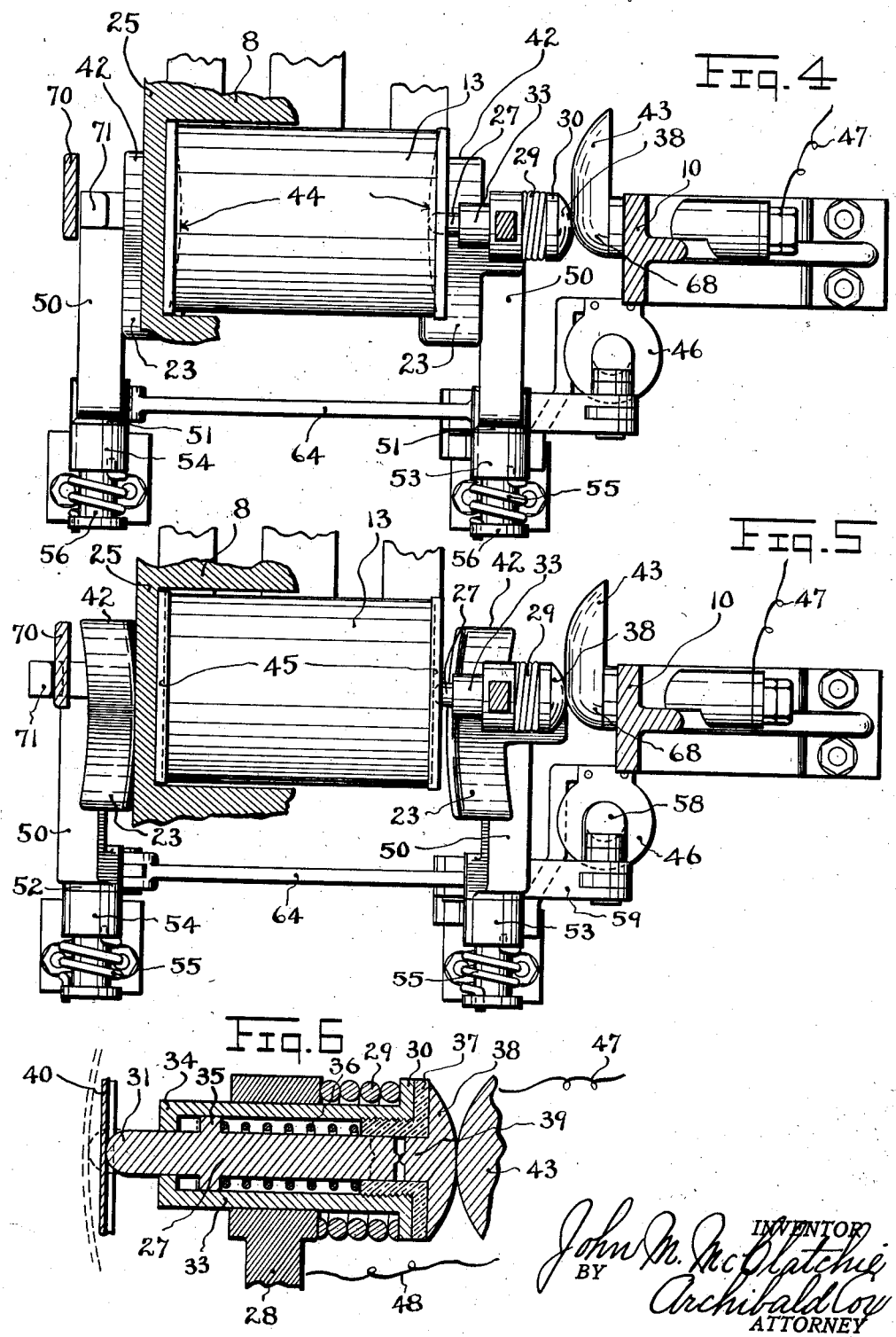

Patented Dec. 11, 1928.

1,694,828

UNITED STATES PATENT OFFICE.

JOHN M. McCLATCHIE, OF NEW YORK, N. Y., ASSIGNOR TO THE BORDEN COMPANY, OF NEW YORK, N. Y., A CORPORATION OF NEW JERSEY.

APPARATUS FOR TESTING CANS FOR LEAKAGE.

Original application filed June 15, 1926, Serial No. 116,141. Divided and this application filed May 20, 1927. Serial No. 192,843.

The invention relates to an improvement in apparatus for testing cans for leakage, and more particularly to an improvement in apparatus for testing for leakage the cylindrical tin cans used for preserving food products such as evaporated milk and the like. The present application is a division of my copending application, Serial No. 116,141, filed June 15, 1926, and is intended to describe and claim the present commercial form of the can testing apparatus disclosed, but not claimed in said application.

When the evaporated milk has been introduced into and hermetically sealed in the cans, as set forth at length in my said application, it is possible to determine whether the cans leak by measuring the distance between the two ends of the cans. It is known that if a can is tight its two ends are more or less concaved, whereas if the can leaks its two ends are substantially straight and parallel. The object of the present invention is to provide an apparatus which will rapidly and accurately test cans to determine whether their ends are straight or concaved, and according to that determination separate the leaky cans from the tight cans. To this end the invention consists in the improved can testing apparatus hereinafter described and particularly pointed out in the appended claims.

In the accompanying drawings illustrating the preferred form of the invention, Fig. 1 is a front side elevation, with parts broken away, of the improved can testing apparatus; Fig. 2 is a rear side elevation of the parts shown in Fig. 1; Fig. 3 is an end elevation of the apparatus, the lower part of the figure being a section taken on the line 3—3 of Fig. 1 and the upper part of the figure showing the star-wheel in section; Figs. 4 and 5 are enlarged sections taken on the line 4—4 of Fig. 3, Fig. 4 showing the position of the parts retaining a tight can in the apparatus, and Fig. 5 showing the position of the parts permitting a leaky can to be discharged from the apparatus; and Fig. 6 is an enlarged detail section through the can feeling device and associated parts.

The improved can testing apparatus illustrated in the drawings comprises a star-wheel or spider 8 mounted on a shaft 9 journalled at its outer ends in the upper ends of the uprights 10 and 11. On one end of the shaft 9 is mounted the gear 12 which may be driven from any convenient source of power to rotate the star-wheel 8 in timed relation with the feed of the cans 13 to the apparatus. As shown in Fig. 1 the star-wheel 8 rotates in a clockwise direction, the cans 13 to be tested being fed to the star-wheel through the lower end of a chute 14 supported by the uprights 15. The cans are successively brought over the upper open end of a chute 16 at which point they are tested, the leaky cans falling down through the chute 16. The tight cans are carried beyond the chute 16 and are discharged from the apparatus through the upper end of a chute 17 supported by the upright 18.

The cans to be tested enter the pockets 20 between the arms 21 of the star-wheel 8 and are supported in their travel through the apparatus by a can runway consisting of the arcuate extension 22 of the chute 14, the movable sections 23, and the arcuate extension 24 of the chute 17. These parts are concentric with the axis of the star-wheel. One end of the pockets 20 is closed by the wall 25 forming one end of the star-wheel. Located opposite the middle of the open other end of each pocket 20 is a feeler pin 27 carried by the outer end of one of the radial arms 28 secured to the center or hub part of the star-wheel.

Each feeler pin 27, as shown in Fig. 6, is slidingly and yieldingly mounted in a cylindrical shell 33 in turn slidingly mounted in the outer end of an arm 28. The closed inner end 34 of each shell 33 is provided with a central hole through which projects the inner end 31 of the feeler pin. A collar 35 integral with the feeler pin limits the inward travel thereof toward the can. The collar 35 is normally held against the end 34 of the shell 33 by an expansion spring 36 surrounding the pin 27 and pressing at its inner end against the collar 35 and at its outer end against a bushing 37 composed of insulating material and screwed into the flanged outer end of the shell 33. The outer end of the feeler pin 27 is slidingly received within a bore in the insulating bushing 37. A spring 29 surrounding the outer end of each shell 33 and pressing at one end against the outer face of the arm 28 and at its other end against the inner face of the flanged extremity 30 of the shell 33 holds the inner end 31 of the feeler pin outside the path of travel of the adjacent edges of the cans entering or leaving the pockets. A button 38 of conducting material and having a neck 39 is inserted in the outer end of each insulating bushing 37. When the feeler pin 27 is in normal position with the collar 35 forced against the end 34 of the shell 33 by the spring 36 a space separates the outer end of the pin 27 from the inner end of the neck 39 of the button 38. When, however, the head 40 of a leaky can, as shown in Fig. 6, is forced against the inner end 31 of the pin 27 and forces it outwardly, the outer end of the pin 27 contacts with the neck 39 of the button 38 and thereby closes an electric circuit.

The rotation of the star-wheel 8 in a clockwise direction brings the cans successively over the open upper end of the chute 16 where they are supported on the movable sections 23. The cans 13 lie in the pockets 20 of the star-wheel 8 in a lengthwise position, and as the center of each can moves over the forward ends 42 of the movable sections 23, the contact button 38 associated with the feeler pin 27 located opposite the can in question moves into engagement with the forward end of a cam piece 43 supported from the upright 10 and projecting into the path of travel of the contact buttons 38 of the feeler pins. The engagement of the contact button 38 by the cam 43 forces the shell 33 inwardly against the action of the spring 29 and brings the inner end 31 of the feeler pin into contact with the adjacent end of the can, the other end of the can being held by the wall 25 of the star-wheel. If the can does not leak so that its two ends are bowed inwardly or are concaved, as indicated by the dotted lines 44 in Fig. 4, the feeler pin will not be moved outwardly against the action of the spring 36 so that the outer end of the feeler pin will not engage the contact button 38. As a result there will be no electrical connection made, the sections 23 will remain stationary and the tight can will be carried through the apparatus to be discharged through the chute 17. When the contact button 38 moves out of engagement with the cam 43 the spring 29 restores the shell 33 and feeler pin 27 to normal position.

When a leaky can is passing through the apparatus the heads thereof will be substantially straight, as indicated by the dotted lines 45 in Fig. 5. Under these conditions when the contact button 38 associated with the feeler pin 27 opposite the leaky can moves into engagement with the cam 43 and the shell 33 is thereby forced inwardly, the engagement of the adjacent head of the leaky can with the inner end 31 of the feeler pin will force the feeler pin outwardly against the action of the spring 36 and cause the outer end of the feeler pin to engage with the inner end of the neck 39 of the contact button 38, thereby establishing an electrical connection from one side of the solenoid 46 through the arm 28, the feeler pin, the contact button, the cam 34 and back to the other side of the solenoid. The ends of the connecting wires are indicated at 47 and 48 in Figs. 3, 4, 5 and 6. Thereupon the movable sections are swung outwardly, as shown in Fig. 5, and by the dotted lines in Fig. 3, permitting the defective can to fall down into the chute 16.

The movable can runway sections 23 are mounted on the upper offset ends of the arms 50 of the levers 51 and 52. The lever 51 is pivoted in the upper end of an upright 53 which supports the solenoid 46, and the lever 52 is pivoted in the upper end of an upright 54. The torsion springs 55 loosely embracing the outer extensions of the pivot pins 56 of the levers 51 and 52 and connected at one end with the pivot pins 56 and at the other end with the uprights 53 and 54 tend to hold the upper ends of the arms 50 toward each other and the sections 23 in normal position forming part of the can runway.

When the solenoid 46 is energized by reason of the fact that a leaky can is engaged by the feeler pin in contact with the cam 43, the contact piece 58 connected with the horizontal arm 59 of the lever 51 is drawn downwardly into contact with the armature 60 of the solenoid, thereby swinging the arms 50 and the sections 23 connected therewith outwardly to permit the leaky can to fall into the chute 16. The two levers 51 and 52 are articulated by a link 61 connecting the outer end of the arm 59 with the outer end of an arm 62 of a lever 63 pivoted in the upright 53 and by a link 64 connecting the arm 65 of the lever 52 with the outer end of the arm 66 of the lever 63.

From a study of Figs. 4 and 5 it will be understood that if a leaky can is over the sections 23 of the can runway, the current through the solenoid 46 will continue only so long as the outer end of the feeler pin 27 is in contact with the button 38 and that immediately the can begins to drop after the sections 23 have been swung outwardly, the contact between the outer end of the feeler pin and the button 38 will be broken, thereby deenergizing the solenoid 46 and permitting the springs 55 to swing the sections 23 into normal position. In order to prevent the sections 23 from swinging inwardly while the defective can is falling down past them into the chute 16, the star-wheel 8 is provided with a series of radial arms 70, corresponding to the pockets 20, the outer end of each arm being located slightly to the rear of the transverse axis of each pocket 20. As the sections 23 are swung outwardly the arm 70 connected with the pocket in which the defective can is located passes by the inner face of a finger 71 extending upwardly from one of the arms 50 and thereby prevents the sections 23 from swinging inwardly, when the head of the defective can leaves the feeler pin 27, until the rotation of the star-wheel carries the arm 70 beyond the finger 71, by which time the defective can will have fallen down clear of the sections 23. When a tight or sound can is over the sections 23, as shown in Fig. 4, the arm 70 passes to the outside of the finger 71.

Having thus described the invention what I claim as new is:—

1. An apparatus for testing cans having end walls comprising, a can runway on which the cans rest and along which they are advanced, a movable section in the can runway, means for advancing a can along the runway, a feeler traveling in unison with the can and arranged to be moved into contact with an end wall thereof, means for moving the feeler into contact with the end wall of the can, and means controlled by the feeler for actuating the movable section of the can runway to permit the can to fall through the runway if the end wall of the can is in a predetermined position as determined by the feeler.

2. An apparatus for testing cans having end walls comprising, a can runway on which the cans rest and along which they are advanced, a movable section in the can runway, means for advancing a can along the runway, solenoid-operated means for actuating the movable section of the runway to permit the can to fall through the runway, an open circuit in which the solenoid is located, a feeler for contacting with an end wall of the can, and means for moving the feeler into contact with the end wall of the can, said feeler being arranged to close the circuit if the end wall of the can is in a predetermined position.

3. An apparatus for testing cans having end walls comprising, a can runway on which the cans rest and along which they are advanced, a movable section located in the can runway, means for advancing a can along the runway, a feeler located opposite an end wall of the can and arranged to travel in unison with the can, said feeler being movable toward and from the end wall of the can, means for moving the feeler into contact with the end wall of the can when the latter moves over the movable section of the can runway, and means controlled by the feeler for actuating the movable section of the runway to permit the can to fall through the runway if the end wall thereof is in a predetermined position as determined by the feeler.

4. An apparatus for testing cans having end walls comprising, a can runway on which the cans rest and along which they are advanced, a movable section forming part of the can runway and adapted to be actuated to permit a can to fall through the runway, a feeler located opposite an end wall of the can and arranged to travel in unison with the can, said feeler being movable toward and from the end wall of the can, a solenoid for actuating the movable section of the can runway, an open circuit in which the solenoid is located, and means arranged to move the feeler into contact with the end wall of the can when the can moves over the movable section of the runway, said feeler being adapted to close the circuit if the end wall of the can, over the movable section of the can runway is in a predetermined position.

5. An apparatus for testing cans having end walls comprising, a can runway on which the cans rest and along which they are advanced, movable can supporting sections forming part of the can runway, means for advancing a can along the runway, a feeler connected with the can advancing means to travel in unison therewith, said feeler being located opposite an end wall of a can, means for yieldingly pressing the feeler toward the can, a cam for moving the feeler into contact with the end wall of the can when the can is moved over the movable sections of the runway, a solenoid for actuating the movable sections of the can runway, an open circuit in which the solenoid is located, one end of the circuit terminating in the cam and the other end of the circuit terminating in the feeler, the feeler being moved by the end wall of the can when the latter is in a predetermined position to close the circuit to energize the solenoid to actuate the movable sections of the runway to permit the can to fall through the runway.

6. An apparatus for testing cans having end walls comprising, a can runway, movable sections forming part of the can runway, means for advancing a can along the runway, a feeler connected with the can advancing means to travel in unison therewith, said feeler being located opposite an end wall of the can and movable toward and from the can, said feeler being in two parts yieldingly held separated, means for moving the feeler into contact with the end wall of the can, the two parts of the feeler remaining separated if the end wall of the can is in one position and being brought together if the end wall of the can is in another position, and a solenoid located in an open circuit and arranged when energized to actuate the movable sections of the can runway to discharge the can therethrough, the ends of the wires of said circuit being closed when the two parts of the feeler are moved together.

7. An apparatus for testing cylindrical cans comprising, a rotatable star-wheel having a series of pockets adapted to receive the cans to be tested, a can runway along which the star-wheel advances the cans, movable sections forming part of the can runway, said sections being pivotally mounted and arranged to swing outwardly to permit a can supported thereon to fall between them, a solenoid arranged to actuate the means for supporting the sections of the can runway, said pockets of the star-wheel having one closed and one open end, a feeler connected with the star-wheel and located opposite the open end of each pocket in position to contact with the adjacent end wall of the can in the pocket, a cam located opposite the movable sections of the can runway for forcing the feeler into contact with the adjacent end wall of the can over the movable sections, and a circuit in which the solenoid is located, one wire of the circuit terminating in the cam and the other wire of the circuit terminating in the feeler, said feeler consisting of a shell having at one end a contact button insulated from the shell and a pin yieldingly mounted in the shell, one end of the pin being adapted to contact with the end wall of the can, and the other end of the pin being normally separated from the contact button but adapted to engage therewith when the end wall of the can is in a predetermined position.

8. An apparatus for testing cylindrical cans comprising, a star-wheel mounted to rotate on a horizontal plane and having a series of can receiving pockets, a can runway formed concentric with the axis of rotation of the star-wheel, two movable sections forming part of the runway and located substantially under the axis of the star-wheel, said sections being mounted to swing outwardly to permit the can supported thereon to drop between them, a solenoid arranged to actuate the movable sections of the can runway, said pockets of the star-wheel having one closed and one open end, a feeler located opposite substantially the middle of the open end of each pocket, a cam located adjacent the movable sections of the can runway to bring the feeler into contact with the adjacent end wall of the can over the movable sections of the runway, an open circuit in which the solenoid is located, one wire of the circuit being connected with the cam and the other wire of the circuit being connected with the feeler, said feeler consisting of two parts: a yieldingly mounted shell having a contact button on its outer end insulated from the rest of the shell and arranged to engage with the cam, and a pin slidingly mounted in the shell and spring pressed toward the can, the outer end of the pin being normally separated from the contact button but adapted to contact therewith if the end wall of a can with which the inner end of the pin is in contact is in a predetermined position.

9. An apparatus for testing cylindrical cans comprising, a star-wheel mounted to rotate on a horizontal plane and having a series of can receiving pockets, a can runway formed concentric with the axis of rotation of the star-wheel, two movable sections forming part of the runway and located substantially under the axis of the star-wheel, said sections being mounted to swing outwardly to permit the can supported thereon to drop between them, a solenoid arranged to actuate the movable sections of the can runway, said pockets of the star-wheel having one closed and one open end, a feeler located opposite substantially the middle of the open end of each pocket, a cam located adjacent the movable sections of the can runway to bring the feeler into contact with the adjacent end wall of the can over the movable sections of the runway, an open circuit in which the solenoid is located, one wire of the circuit being connected with the feeler, said feeler consisting of two parts: a yieldingly mounted shell having a contact button on its outer end insulated from the rest of the shell and arranged to engage with the cam, and a pin slidingly mounted in the shell and spring pressed toward the can, the outer end of the pin being normally separated from the contact button but adapted to contact therewith if the end of a can with which the inner end of the pin is in contact is in a predetermined position, a series of arms fixed to the star-wheel, each arm being located opposite a pocket, and a finger projecting upwardly from one of the sections of the can runway, the ends of the arms passing on the outside of the finger while the sections remain in normal can supporting position, but passing on the inside of the finger when the sections have been actuated and engaging the finger to prevent the return of the sections to normal position until the arm is disengaged from the finger.

JOHN M. McCLATCHIE.